(12) United States Patent
Shin et al.

(10) Patent No.: US 11,084,355 B2
(45) Date of Patent: Aug. 10, 2021

(54) COMPRESSOR FOR VEHICLE

(71) Applicant: Hanon Systems, Daejeon (KR)

(72) Inventors: In Cheol Shin, Daejeon (KR); Chi Myeong Moon, Daejeon (KR); Hyun Seong Ahn, Daejeon (KR); Kweon Soo Lim, Daejeon (KR); Jae Hoon Lim, Daejeon (KR); Soo Cheol Jeong, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/320,843

(22) PCT Filed: Feb. 14, 2018

(86) PCT No.: PCT/KR2018/001939
§ 371 (c)(1),
(2) Date: Jan. 25, 2019

(87) PCT Pub. No.: WO2018/151531
PCT Pub. Date: Aug. 23, 2018

(65) Prior Publication Data
US 2019/0160915 A1 May 30, 2019

(30) Foreign Application Priority Data

Feb. 17, 2017 (KR) .................. 10-2017-0021493
Feb. 13, 2018 (KR) .................. 10-2018-0017408

(51) Int. Cl.
*F04B 39/00* (2006.01)
*F04B 39/12* (2006.01)
(Continued)

(52) U.S. Cl.
CPC .......... *B60H 1/32* (2013.01); *F04B 39/0094* (2013.01); *F04B 39/121* (2013.01); *F04B 39/14* (2013.01); *F04C 2240/30* (2013.01)

(58) Field of Classification Search
CPC .... F04B 39/0094; F04B 39/14; F04B 39/121; F04C 2240/30; B60H 1/32
(Continued)

(56) References Cited

U.S. PATENT DOCUMENTS 5,090,657 A * 2/1992 Dreiman ............... F16F 15/067
248/624
6,354,558 B1 * 3/2002 Li ......................... F16F 1/3732
248/615

(Continued)

FOREIGN PATENT DOCUMENTS

JP   H06143989 A   5/1994
JP   2013508613 A   3/2013
(Continued)

*Primary Examiner* — Connor J Tremarche
(74) *Attorney, Agent, or Firm* — Norton Rose Fulbright US LLP; James R. Crawford

(57) ABSTRACT

Disclosed herein is a compressor that includes a casing, a fastening part disposed at a portion corresponding to a support bracket provided in a compressor mounting part of a vehicle on the casing, and a fastener connecting the support bracket to the fastening part, wherein a compressor's center of gravity and a compressor's point of support supported by the fastener are positioned in a longitudinal direction of the fastener. The present disclosure has an effect of relieving rotational moment and fatigue stress occurring in the compressor when the compressor is mounted to the vehicle.

9 Claims, 12 Drawing Sheets

(51) Int. Cl.
*B60H 1/32* (2006.01)
*F04B 39/14* (2006.01)

(58) Field of Classification Search
USPC .......................................................... 417/363
See application file for complete search history.

(56) References Cited

U.S. PATENT DOCUMENTS

2012/0251357 A1   10/2012  Yokoi et al.
2015/0047383 A1*  2/2015  Hong ................... F04D 29/668
                                                    62/296

FOREIGN PATENT DOCUMENTS

| | | |
|---|---|---|
| JP | 2014008793 A | 1/2014 |
| JP | 2016138495 A | 8/2016 |
| KR | 20050040614 A | 5/2005 |
| KR | 20080065433 A | 7/2008 |
| KR | 20130106737 A | 9/2013 |
| KR | 20150008584 A | 1/2015 |
| KR | 20150021640 A | 3/2015 |
| WO | 2017090263 A1 | 6/2017 |

* cited by examiner

Related Art

Related Art

COMPRESSOR FOR VEHICLE

This application is a national phase under 35 U.S.C. § 371 of International Application No. PCT/KR2018/001939 filed Feb. 14, 2018, which claims the benefit of priority to Korean Patent Application Nos. 10-2017-0021493 filed on Feb. 17, 2017 and 10-2018-0017408 filed on Feb. 13, 2018. The entire contents of these applications are incorporated herein by reference in their entirety.

TECHNICAL FIELD

The present disclosure relates to a compressor, and more particularly, to a compressor having a fastening structure that relieves a rotational moment and a fatigue stress.

BACKGROUND ART

In general, compressors serving to compress refrigerants in vehicle cooling systems have been developed in various forms. Examples of these compressors include a reciprocating compressor configured such that its component compresses a refrigerant while reciprocating, and a rotary compressor configured such that its component compresses a refrigerant while rotating.

Here, examples of the reciprocating compressor include a crank compressor that transmits driving force from a drive source to a plurality of pistons using a crank, a swash plate compressor that transmits driving force from a drive source to a rotary shaft having a swash plate installed thereto, and a wobble plate compressor that uses a wobble plate. Examples of the rotary compressor include a vane rotary compressor that uses a rotary shaft and a vane, and a scroll compressor that uses an orbiting scroll and a fixed scroll.

Meanwhile, examples of the swash plate compressor include a fixed-capacity swash plate compressor having a swash plate, the installation angle of which is fixed, and a variable-capacity swash plate compressor capable of changing a discharge capacity by changing the angle of inclination of a swash plate.

These compressors are typically mounted to the bodies of vehicles. FIGS. 1 and 2 illustrate a fastening structure of a compressor 1 that is mounted to a body of a conventional vehicle V.

Referring to FIGS. 1 and 2, the conventional compressor 1 is mainly fastened and coupled to a compressor mounting part 2 of the vehicle V by bolts 5 in a direction horizontal to the ground W. The compressor mounting part 2 has three mounting holes 2a, 2b, and 2c formed in the direction horizontal to the ground W and a compressor casing 3 has a corresponding number of fastening parts 4 formed in the direction horizontal to the ground W, so that the compressor is mounted to the body of the vehicle V by fastening the fastening parts to the mounting holes using the respective bolts 5.

However, in the horizontal fastening structure illustrated in FIGS. 1 and 2, a compressor's center of gravity B subjected to the self-weight of the compressor due to gravity does not coincide with a compressor's point of support A supported by bolting the compressor to the compressor mounting part, which causes a rotational moment about the compressor's center of gravity B. The rotational moment increases by distances D1 and D2 between the compressor's point of support A and the compressor's center of gravity B.

A fatigue stress C is mainly concentrated on the specific portion of the bolt 5 positioned on the boundary between the compressor mounting part 2 and each of the compressor fastening parts 4. This fatigue stress C increases as the distances D1 and D2 between the compressor's point of support A and the compressor's center of gravity B increase.

Here, in the operating environment of the vehicle, for example in the operating environment such as speed bumps or unpaved roads, vibration or impact occurs in the vertical direction of the vehicle, and this vibration or impact is transmitted to the compressor 1 through the compressor mounting part 2. Especially, greater vibration or impact is transmitted to the portion on which the fatigue stress C is concentrated.

The vibration or impact causes a rapid increase in rotational moment and fatigue stress to the bolts 5, and thus if it continues for a long time, there is an increased risk of fatigue failure. All of the bolts 5 are damaged in extreme cases, which may lead to an accident in which the compressor 1 is decoupled from the vehicle V.

DISCLOSURE

Technical Problem

Accordingly, the present disclosure has been made in view of the above-mentioned problems, and an object thereof is to provide a compressor having a fastening structure that relieves a rotational moment and a fatigue stress occurring in the compressor when the compressor is mounted to a vehicle.

Technical Solution

In accordance with an aspect of the present disclosure, a compressor is mounted to a support bracket disposed in a compressor mounting part of a vehicle and includes a casing, a fastening part disposed at a portion corresponding to the support bracket on the casing, and a fastener connecting the support bracket to the fastening part, wherein a compressor's center of gravity and a compressor's point of support supported by the fastener are positioned in a longitudinal direction of the fastener.

In an embodiment of the present disclosure, the compressor's center of gravity and the compressor's point of support may be positioned in a direction perpendicular to the longitudinal direction of the fastener.

In an embodiment of the present disclosure, the compressor's center of gravity may be positioned lower than the compressor's point of support in the longitudinal direction of the fastener.

In an embodiment of the present disclosure, the support bracket may consist of a plurality of support brackets arranged in the compressor mounting part, the fastening part may consist of a number of fastening parts corresponding to the number of support brackets on the casing, the fastener may consist of a plurality of fasteners connecting the support brackets to the fastening parts, and the compressor's point of support may consist of a plurality of compressor's points of support by the plurality of fasteners.

In an embodiment of the present disclosure, the compressor's point of support may consist of three or more compressor's points of support, and the three or more compressor's points of support may define a support region on the same plane.

In an embodiment of the present disclosure, the compressor's center of gravity may be positioned within the support region.

In an embodiment of the present disclosure, the compressor's center of gravity and a center of the compressor's points of support formed within the support region may be positioned on the same line in the longitudinal direction of the fasteners.

In an embodiment of the present disclosure, the compressor may further include a buffer disposed between the support bracket and the fastening part to relieve vibration and/or impact transmitted from the compressor mounting part to the compressor.

In an embodiment of the present disclosure, the buffer may be disposed between the support bracket and the fastening part and may include a contact pad made of an elastic material.

In an embodiment of the present disclosure, the buffer may further include a shock-absorbing elastic body disposed in a bracket groove formed in a lower end of the support bracket, and a buffering block, an upper side of which is connected to a lower end of the shock-absorbing elastic body, while a lower side of the buffering block is connected to an upper surface of the contact pad.

In an embodiment of the present disclosure, the fastening part may have a first thread formed therein, and the fastener may have a second thread formed on its outer peripheral surface to be engaged to the first thread.

In an embodiment of the present disclosure, the fastener may include a head seated into the support bracket, a first stem disposed beneath the head, the second thread being formed along an outer peripheral surface of the first stem, a second stem disposed beneath the first stem, and a stem buffer disposed between the first stem and the second stem to relieve vibration and/or impact transmitted from the compressor mounting part through the fastener to the compressor.

In an embodiment of the present disclosure, the stem buffer may include a stem groove formed in a lower end of the first stem, and a connecting protrusion formed at an upper end of the second stem and inserted and disposed into the stem groove.

In an embodiment of the present disclosure, the stem buffer may further include a guide block formed along a circumference of the stem groove in the lower end of the first stem and having a shape that protrudes inward from the stem groove, and the connecting protrusion may be supported by the guide block for separation prevention.

In an embodiment of the present disclosure, the stem buffer may further include a stem elastic body disposed between the inside of the stem groove and the connecting protrusion.

Advantageous Effects

In accordance with the present disclosure, a compressor's point of support and a compressor's center of gravity are oriented in the longitudinal direction of a fastener in a compressor mounted to a vehicle. Therefore, it is possible to relieve values of rotational moment and fatigue stress occurring in the compressor when the compressor's point of support does not coincide with the compressor's center of gravity, compared to when a conventional compressor is mounted to the vehicle in a direction horizontal to the ground.

In particular, since the compressor is mounted to the vehicle in a direction perpendicular (or vertical) to the longitudinal direction of the fastener, it is possible to relieve an increase in rotational moment and fatigue stress by impact and/or vibration transmitted to the compressor while the vehicle is traveling.

In addition, the compressor's point of support may consist of a plurality of compressor's points of support when the compressor is mounted to the vehicle. In the case where three or more fastening portions are formed, the compressor's points of support define a support region, in which case the compressor is mounted to the vehicle such that the compressor's center of gravity is positioned on the same line as the center in the support region. Therefore, it is possible to relieve the rotational moment and fatigue stress occurring in the compressor.

Furthermore, since a contact pad made of an elastic material or a buffer is disposed in the support bracket of the vehicle and the fastening part of the compressor, it is possible to relieve the vibration and/or impact transmitted to the compressor while the vehicle is traveling.

BEST MODE FOR INVENTION

Reference will now be made in detail to preferred embodiments of a compressor according to the present disclosure, examples of which are illustrated in the accompanying drawings.

Figure 12:
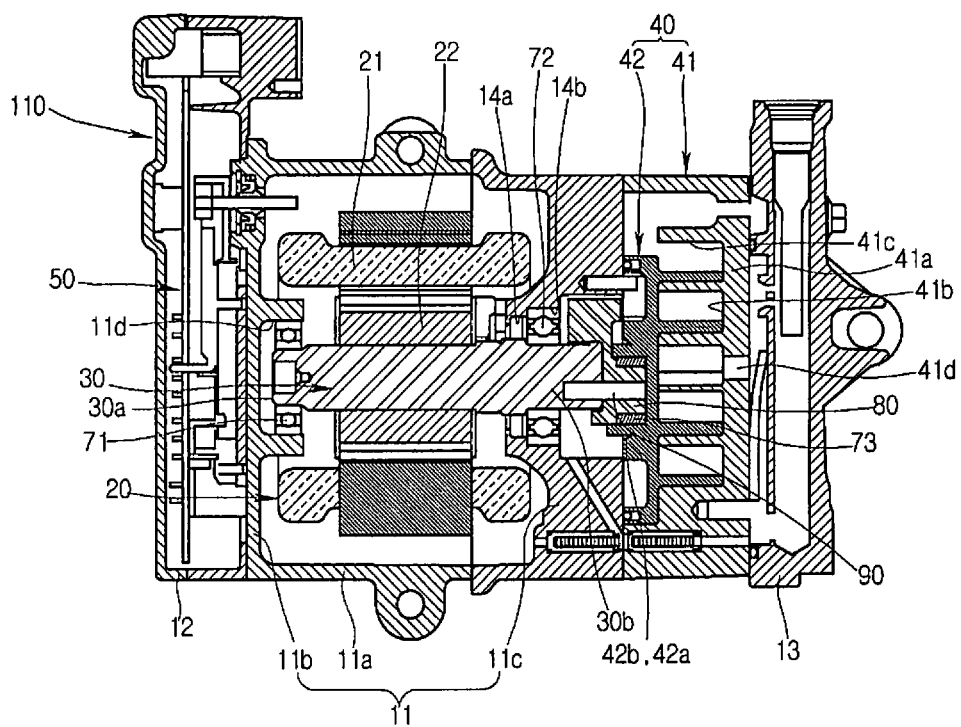
FIG. 12 is a side cross-sectional view illustrating an example of a motor-driven compressor pertaining to the present disclosure.

First, a motor-driven compressor pertaining to the present disclosure will be described with reference to FIG. 12. The structure of the motor-driven compressor illustrated in FIG. 12 is by way of example only, and the present disclosure may also be applied to other motor-driven compressors. Of course, a mechanical compressor may also be included according to the fastening structure thereof.

Here, the mounting position of the mechanical compressor is limited since the mechanical compressor must be connected to an engine by a belt for operation, whereas the motor-driven compressor is characterized in that it has a high degree of freedom in an in-vehicle mounting position, compared to the mechanical compressor, since the motor-driven compressor is self-driven.

Referring to FIG. 12, the motor-driven compressor pertaining to the present disclosure may include a casing 110, a motor 20 that generates a driving force in the casing 110, a drive shaft 30 that is rotated by the motor 20, and a compression mechanism 40 that is driven by the drive shaft 30 to compress a refrigerant.

The casing 110 may include a first housing 11 that accommodates the motor 20, a second housing 12 that accommodated an inverter 50 for controlling the motor 20, and a third housing 13 that accommodated the compression mechanism 40.

The first housing 11 may include an annular wall 11a, a first partition wall 11b covering one end of the annular wall 11a, and a second partition wall 11c covering the other end of the annular wall 11a. The annular wall 11a and the first and second partition walls 11b and 11c may define a motor accommodation space in which the motor 20 is accommodated.

The second housing 12 may be coupled to the first partition wall 11b to define an inverter accommodation space in which the inverter 50 is accommodated.

The third housing 13 may be coupled to the second partition wall 11c to define a compressor space in which the compression mechanism 40 is accommodated.

The second partition wall 11c may separate the motor accommodation space from the compression space, and serve as a main frame that supports the compression mechanism 40. The second partition wall 11c may have a bearing hole 14a formed in the center thereof such that the drive shaft 30 for operatively connecting the motor 20 to the compression mechanism 40 passes through the bearing hole 14a.

The compression mechanism 40 may include a fixed scroll 41 fastened to the second partition wall 11c, and the third housing 13 may be fastened to the fixed scroll 41. However, the present disclosure is not limited thereto, and the third housing 13 may also be fastened to the second partition wall 11c while accommodating the compression mechanism 40.

The motor 20 may include a stator 21 that is fixed in the first housing 11, and a rotor 22 that is rotated by interaction with the stator 21 inside the stator 21.

The drive shaft 30 may pass through the center of the rotor 22 so that one end of the drive shaft 30 protrude toward the first partition wall 11b from the rotor 22 and the other end thereof protrudes toward the second partition wall 11c from the rotor 22.

One end 30a of the drive shaft 30 may be rotatably supported by a first bearing 71 provided at the center of the first partition wall 11b.

The first partition wall 11b may have a first support groove 11d formed in the center thereof such that the first bearing 71 and one end of the drive shaft 30 are inserted into the first support groove 11d. The first bearing 71 may be interposed between the first support groove 11d and one end of the drive shaft 30.

The other end 30b of the drive shaft 30 may be connected to the compression mechanism 40 through the bearing hole 14a of the second partition wall 11c.

The other end of the drive shaft 30 is connected with an eccentric bush 80 by a connecting pin 90. The eccentric bush 80 may be rotatably supported by a third bearing 73 provided in the compression mechanism 40. The eccentric bush 80 according to the present disclosure will be described later.

The bearing hole 14a of the second partition wall 11c may have a second support groove 14b formed to dispose the second bearing 72, and the second bearing 72 may be interposed between the second support groove 14b and the drive shaft 30.

The compression mechanism 40 may include an orbiting scroll 42 having a boss 42a into which the third bearing 73 and the eccentric bush 80 are inserted, and the third bearing 73 may be interposed between the boss 42a and the eccentric bush 80.

The fixed scroll 41 included in the compression mechanism 40 may be fixedly coupled to the second partition wall 11c at the opposite side of the motor 20, and the orbiting scroll 42 included in the compression mechanism 40 may be engaged to the fixed scroll 41 between the second partition wall 11c and the fixed scroll 41 to form two pairs of compression chambers and be orbited by the drive shaft 30.

The fixed scroll 41 may include a fixed end plate 41a having a disk shape, and a fixed wrap 41c that protrudes from a compressed surface 41b of the fixed end plate 41a to be engaged to the orbiting scroll 42.

The fixed end plate 41a may have a discharge port 41d formed at the center thereof such that the refrigerant compressed in the compression chambers is discharged from the discharge port 41d through the fixed end plate 41a. The discharge port 41d may communicate with a discharge space defined between the fixed scroll 41 and the third housing 13.

In the motor-driven compressor having such a configuration, when electric power is applied to the motor 20, the drive shaft 30 may transmit a rotational force to the orbiting scroll 42 while rotating together with the rotor 22. The orbiting scroll 42 is orbited by the drive shaft 30, thereby enabling the compression chambers to be reduced in volume while continuing to move toward the centers thereof. A refrigerant may be introduced into the motor accommodation space through a refrigerant inlet (not shown) formed in the annular wall 11a of the first housing 11. The refrigerant in the motor accommodation space may be sucked into the compression chambers through a refrigerant through-hole (not shown) formed in the second partition wall 11c of the first housing 11. The refrigerant sucked into the compression chambers may be compressed while flowing to the centers of the compression chambers along the flow paths thereof and may be discharged to the discharge space through the discharge port 41d. The refrigerant introduced into the discharge space may be discharged out of the motor-driven compressor through a refrigerant outlet formed in the third housing 13. This series of processes is repeated.

In these processes, the drive shaft 30 may be rotatably supported by the first and second bearings 71 and 72 and the orbiting scroll 42 may be supported by the third bearing 73 so as to be rotatable about the drive shaft 30. In this case, the third bearing 73 may differ from the first and second bearings 71 and 72 to reduce the weight and size of an assembly (hereinafter, referred to as an "orbiting body") of the third bearing 73 and the orbiting scroll 42.

In detail, the first and second bearings 71 and 72 fixed in the casing 110 may each be a ball bearing for minimum loss of friction.

On the other hand, the third bearing 73, which is in proportional to the weight and size of the orbiting body according to the orbiting thereof together with the orbiting scroll 42, may be a needle roller bearing or a slide bush bearing having a weight and a size smaller than the ball bearing while being low in cost. The third bearing 73 may be press-fitted to the boss 42a by a predetermined pressing force.

Hereinafter, a fastening structure of a compressor according to the present disclosure will be described.

Figure 3:
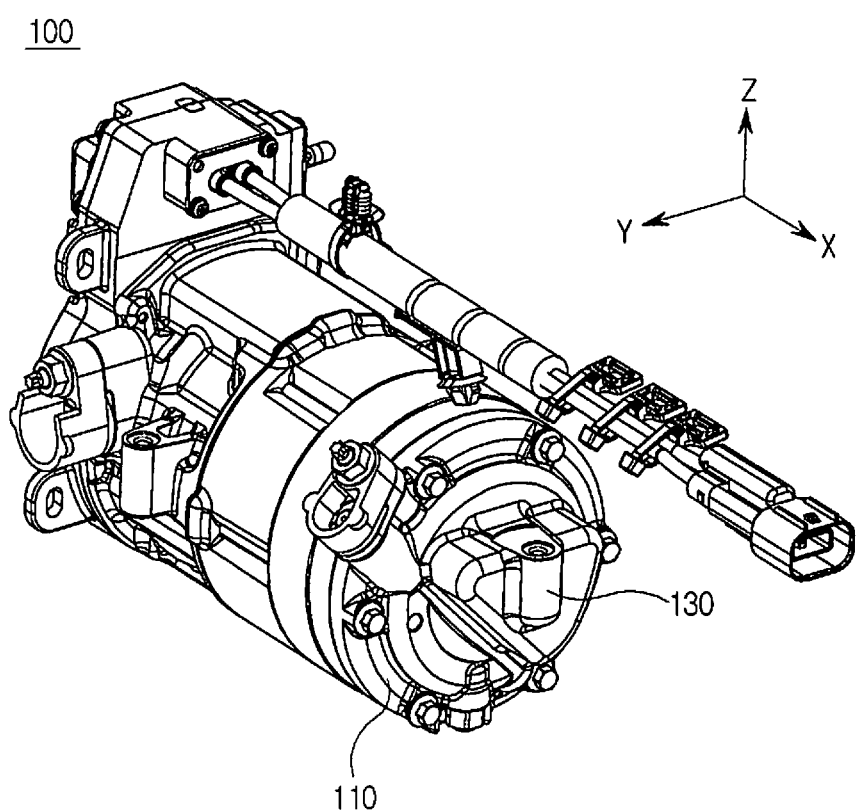
FIG. 3 is a perspective view illustrating a compressor according to the present disclosure.
Figure 4:
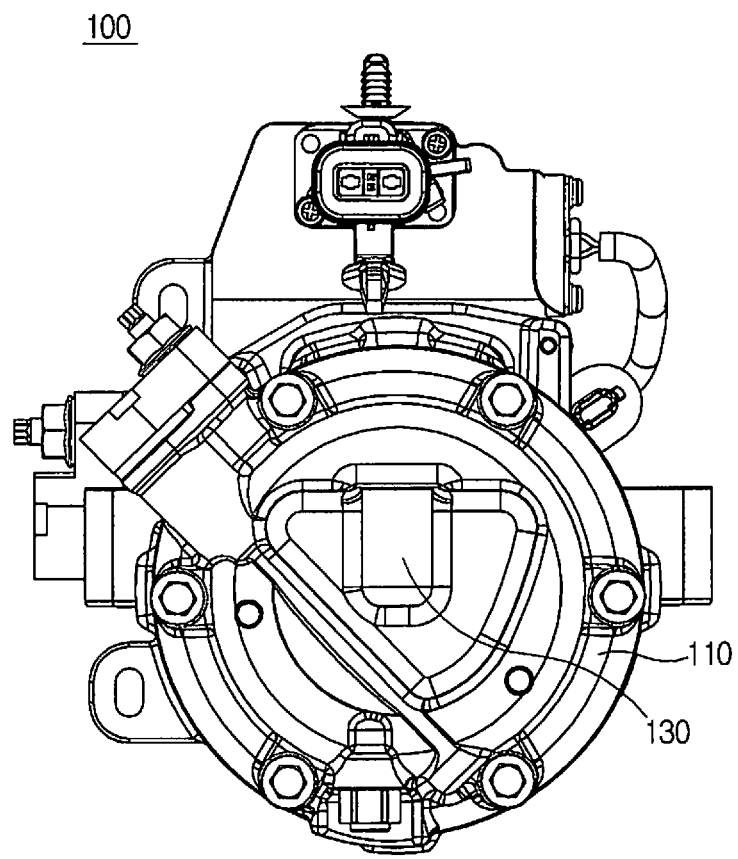
FIG. 4 is a front view illustrating the compressor according to the present disclosure.
Figure 5:
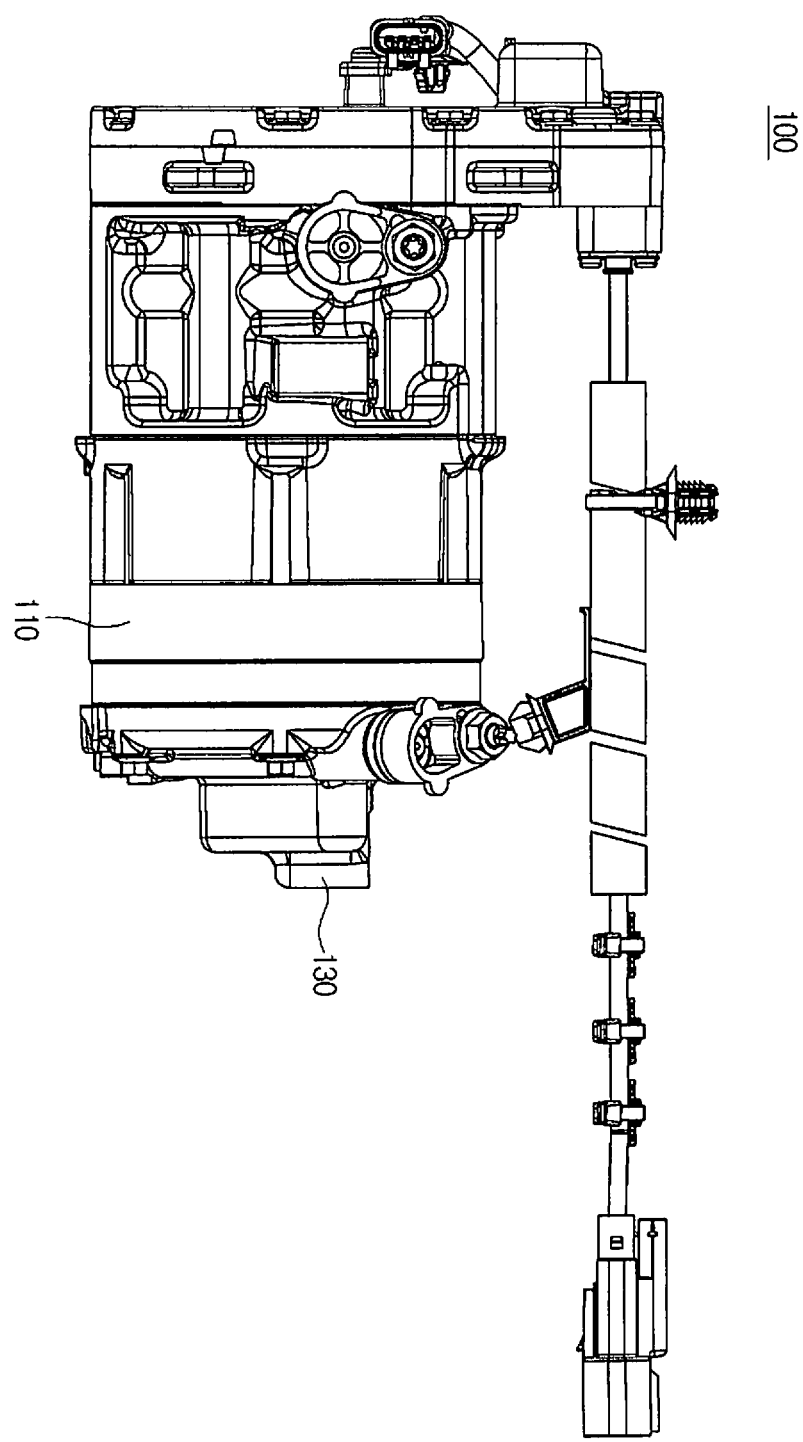
FIG. 5 is a side view illustrating the compressor according to the present disclosure.
Figure 6:
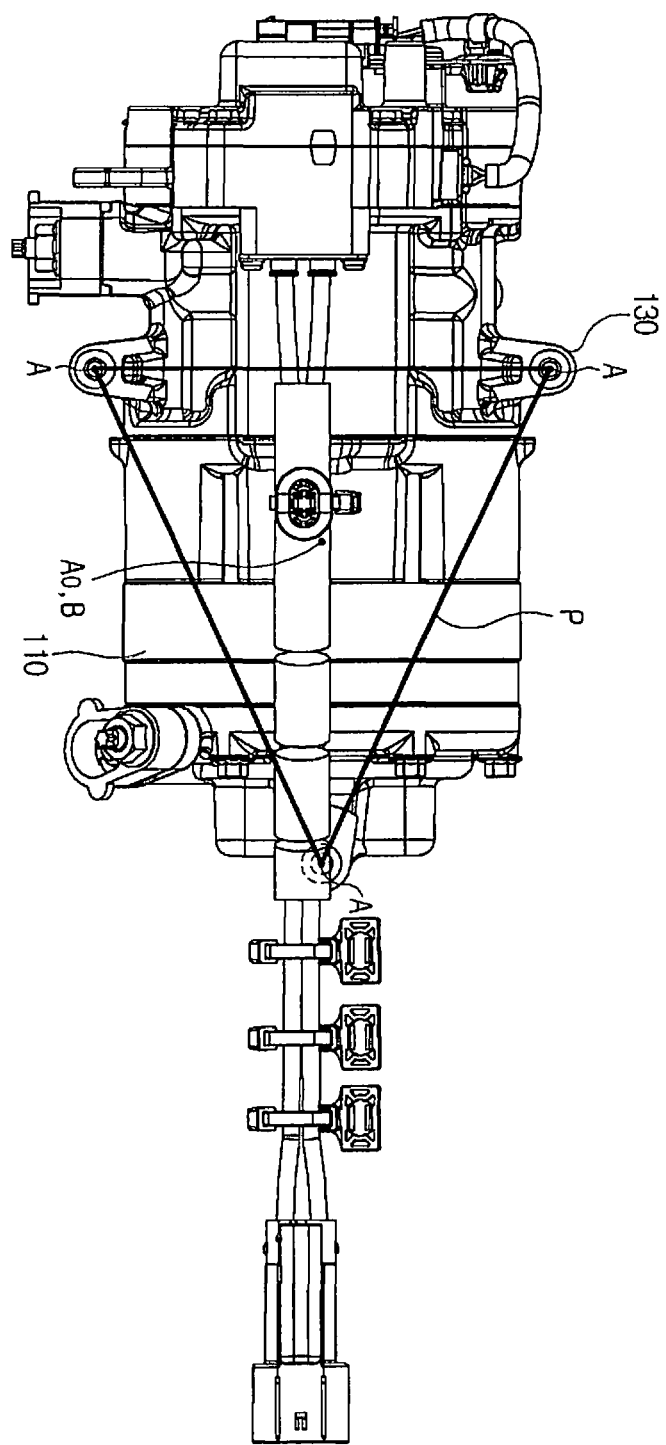
FIG. 6 is top view illustrating the compressor according to the present disclosure.
Figure 7:
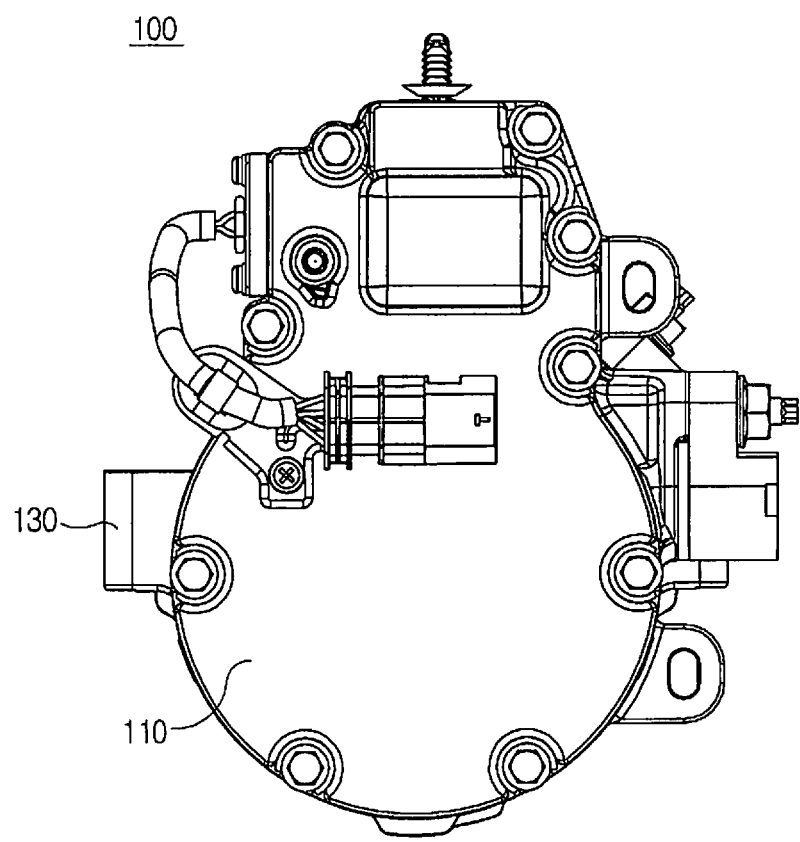
FIG. 7 is a rear view illustrating the compressor according to the present disclosure.
Figure 8:
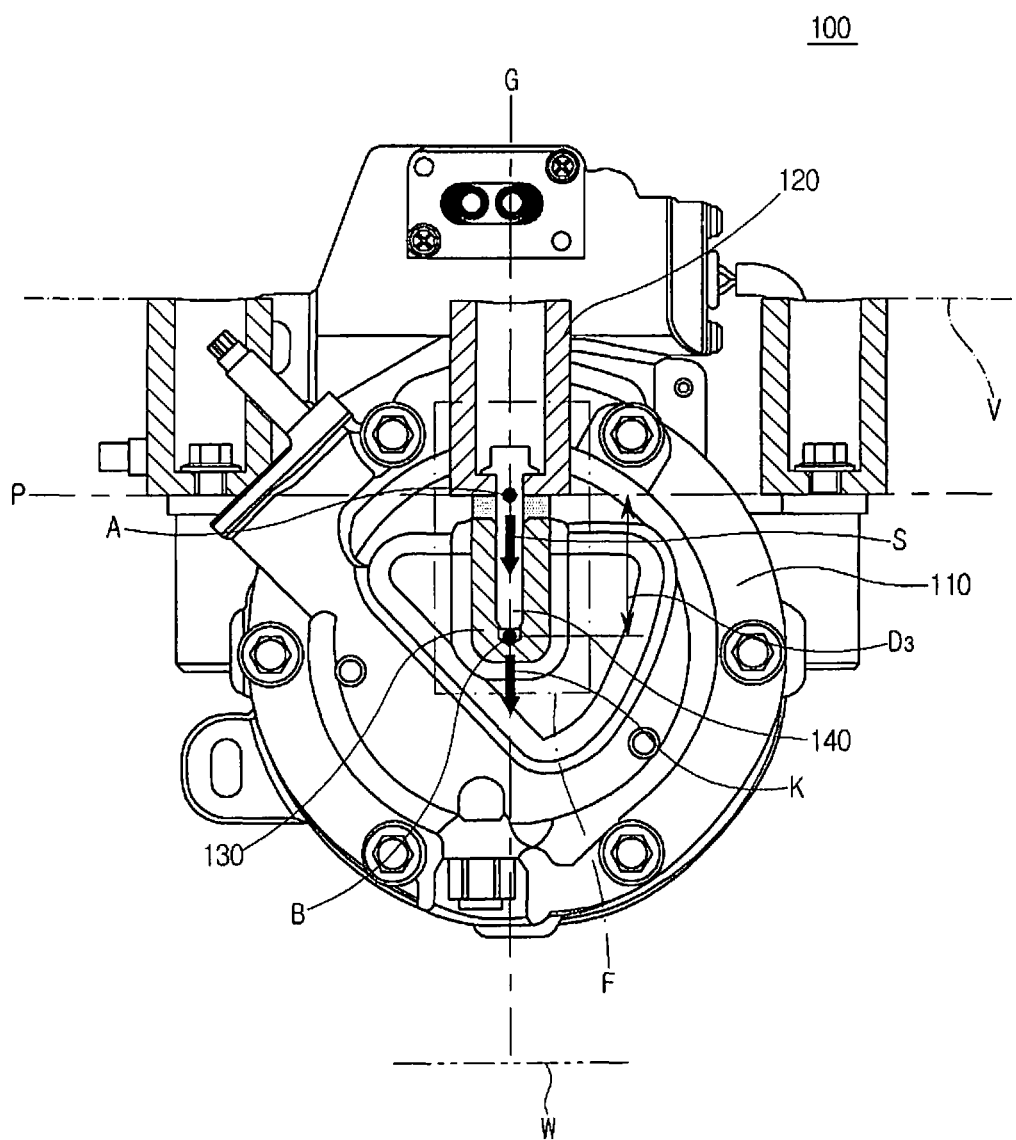
FIG. 8 is a view illustrating arrangement of a compressor's point of support are a compressor's center of gravity according to which the compressor of the present disclosure is mounted to a vehicle in a direction perpendicular to the ground.

FIG. 3 is a perspective view illustrating a compressor 100 according to the present disclosure. FIG. 4 is a front view illustrating the compressor 100 according to the present disclosure. FIG. 5 is a side view illustrating the compressor 100 according to the present disclosure. FIG. 6 is top view illustrating the compressor 100 according to the present disclosure. FIG. 7 is a rear view illustrating the compressor 100 according to the present disclosure. FIG. 8 is a view illustrating arrangement of a compressor's point of support A are a compressor's center of gravity B according to which the compressor 100 of the present disclosure is mounted to a compressor mounting part V of a vehicle in a direction perpendicular to the ground.

First, the general shape of the compressor 100 according to the present disclosure can be seen with reference to FIGS. 3 to 7. The compressor 100 according to the present disclosure is fastened to the vehicle, but the shape thereof is not limited to that illustrated in FIGS. 3 to 7.

FIG. 8 illustrates a support bracket 120 formed in the compressor mounting part V of the vehicle, and the compressor 100 according to the present disclosure may be mounted to the support bracket 120. Here, the compressor mounting part V of the vehicle may be a body of the vehicle.

The compressor 100 according to the present disclosure may include a casing 110, a fastening part 130, and a fastener 140.

The casing 110 may include a compression part for compressing a refrigerant therein, and a variety of electronic and mechanical components required to operate the compressor may be disposed on the casing 110.

Figure 9:
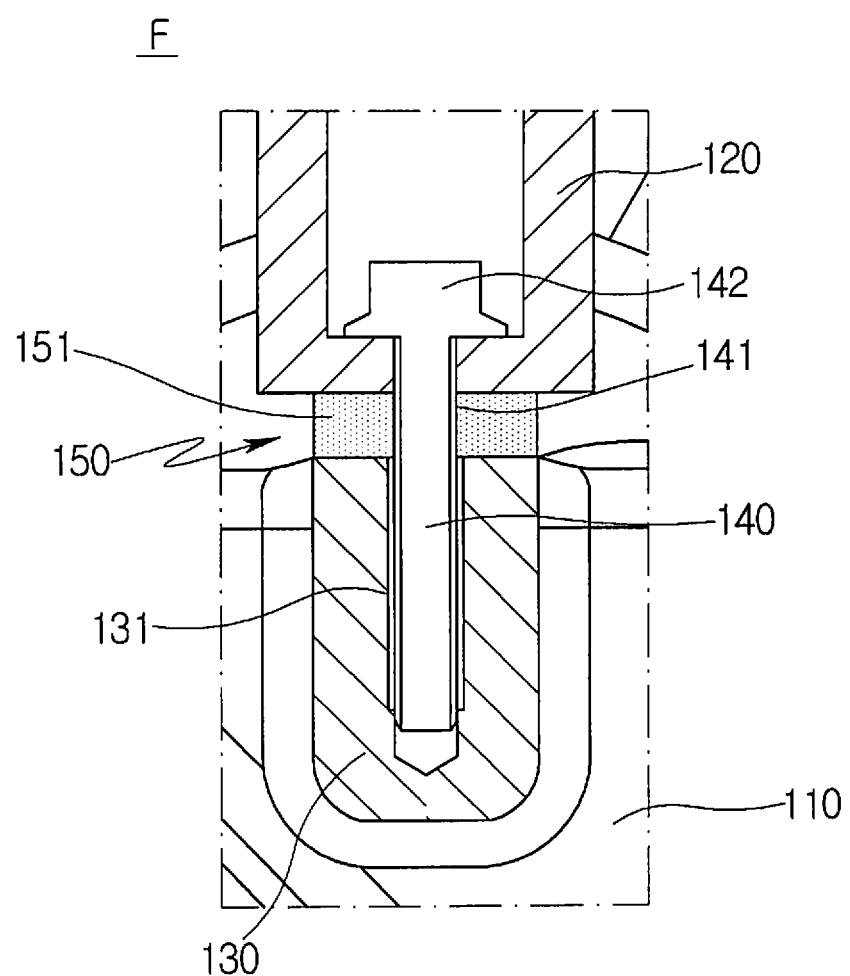
FIG. 9 is a view illustrating a first example of a buffer in the present disclosure.

The fastening part 130 may have a hole formed in the center thereof, and may be disposed at a portion corresponding to the support bracket 120 on the casing 110. Referring to FIG. 9, a first thread 131 may be formed in the hole of the fastening part 130.

The fastener 140 may connect the support bracket 120 to the fastening part 130, and a second thread 141 engaging with the first thread 131 may be formed on the outer peripheral surface of the fastener 140, as illustrated in FIG. 9.

Referring to FIG. 8 again, the support bracket 120 may be disposed on the compressor mounting part V of the vehicle in a direction perpendicular to the ground W. The fastening part 130 may also be disposed corresponding to the support bracket 120 in the direction perpendicular to the ground W. The fastener 140 may also connect the support bracket 120 to the fastening part 130 in the direction perpendicular to the ground W.

Preferably, the support bracket 120 may be disposed in a direction of gravity K or in a direction vertical to the ground W, and thus the fastening part 130 and the fastener 140 may also be disposed in the direction of gravity or in the vertical direction. However, the present disclosure is not limited thereto.

The support bracket 120 may consist of a plurality of support brackets arranged on the compressor mounting part V, and the fastening part 130 may consist of a number of fastening parts corresponding to the number of support brackets 120 on the casing 110. The fastener 140 may consist of a plurality of fasteners corresponding to the number of support brackets 120 and the number of fastening parts 130.

Here, each of the support bracket 120, the fastening part 130, and the fastener 140 may be three or more. If each of them is three or more, the compressor's point of support A may consist of a plurality of compressor's points of support by the three or more fasteners 140.

Referring to FIG. 6, the compressor's point of support A may be positioned at three positions on the casing 110 in the present disclosure. In this case, the compressor's points of support A supported by the three fasteners 140 and the compressor's center of gravity B subjected to the self-weight of the compressor due to gravity may be positioned on the same line G in the longitudinal direction of the fasteners 140, as illustrated in FIGS. 6 and 8.

That is, each of the compressor's points of support A and the compressor's center of gravity B may be positioned in the longitudinal direction of the fastener 140 or in the direction perpendicular to the ground. In this case, the ground is assumed to be relatively horizontal.

The compressor's center of gravity B may be positioned at a position lower than the compressor's point of support A in the longitudinal direction of the fastener 140 or with respect to the ground W. This considers that position stability for relieving the rocking of an object becomes high when the center of gravity of the object is typically positioned lower than the point of support of the object with respect to the ground W.

Thus, since the compressor's center of gravity B is positioned lower than the compressor's point of support A, which is formed on the boundary between the support bracket 120 and the fastening part 130, in the longitudinal direction of the fastener 140 or with respect to the ground W, rocking due to vibration and/or impact occurring while the vehicle is traveling may be reduced. Of course, in the present disclosure, the compressor's center of gravity B may also be positioned higher than the compressor's point of support A.

In the present disclosure, three compressor's points of support A are formed on the casing 110 of the compressor 100 since three fastening parts are formed. These compressor's points of support A define a support region P on the same plane as the compressor 100, as illustrated in FIGS. 6 and 8. If the ground W is assumed to be relatively horizontal, the support region P may be defined relatively parallel to the ground.

The compressor's points of support A may be formed in many positions on the casing 110 of the compressor 100. As the number of compressor's points of support increases, it is possible to more securely fasten the compressor 100.

In this case, defining the support region P on the same plane means that the compressor's points of support A are formed at the same height as the ground W on the casing 110 of the compressor 100. That is, the support brackets 120 and the fastening parts 130 are positioned on the same plane.

If the support region P on the same plane is relatively parallel to the ground, all of the compressor's points of support A are positioned parallel to the ground W, which means that fatigue stresses S applied to the respective fasteners 140 connecting the support brackets 120 to the fastening parts 130 by the self-weight of the compressor due to gravity are evenly distributed.

Through such a structure, it is possible to prevent a possibility of relative damage of a specific fastener 140 from increasing since the fasteners 140 have relatively the same fatigue stress S.

Preferably, the compressor's points of support A of the present disclosure define the support region P on the same plane and the support region P is defined relatively parallel to the ground W. As a result, the fastening force of the compressor is further improved.

Referring to FIG. 6, the compressor's center of gravity B may be positioned within the support region P by the formation of the support region P.

Since the compressor's center of gravity B is positioned within the support region P, the self-weight (weight) of the compressor is relatively evenly distributed in each of the compressor's points of support A defining the support region P. This enables the compressor to be stably supported by the fasteners 140.

Referring to FIG. 8, the compressor's center of gravity B and a center point A0 of the compressor's points of support A formed in the support region P may be positioned on the same line G in the longitudinal direction of the fasteners 140 or with respect the ground W.

When the center point A0 of the compressor's points of support A and the compressor's center of gravity B are positioned on the same line G in the longitudinal direction of the fasteners 140 or in a direction perpendicular to the ground W, no rotational moment occurs since a horizontal distance is not present between the center point A0 of the compressor's points of support A and the compressor's center of gravity B.

In this case, only vertical distances D3 are present. The difference between the vertical distances D3 does not also cause a rotational moment since the fatigue stress S applied to the center point A0 of the compressor's points of support A due to gravity and the self-weight of the compressor applied to the compressor's center of gravity B are oriented in the same direction.

Since the fatigue stress S is distributed in the longitudinal direction of the fasteners 140, a damage risk is relieved compared to the conventional compressor fastening structure.

Figure 1:
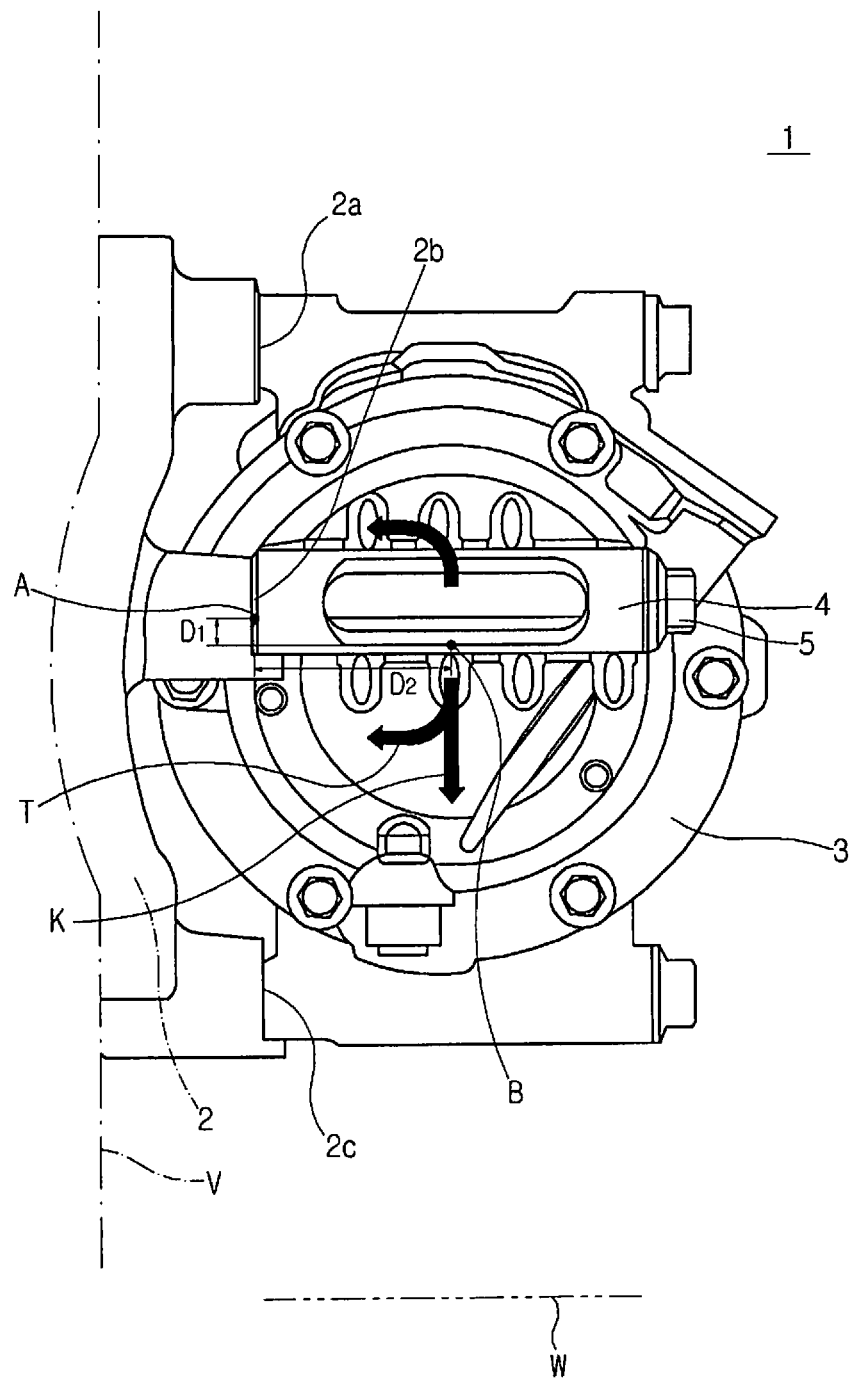
FIG. 1 is a view illustrating a fastening structure of a compressor mounted to a conventional vehicle.
Figure 2:
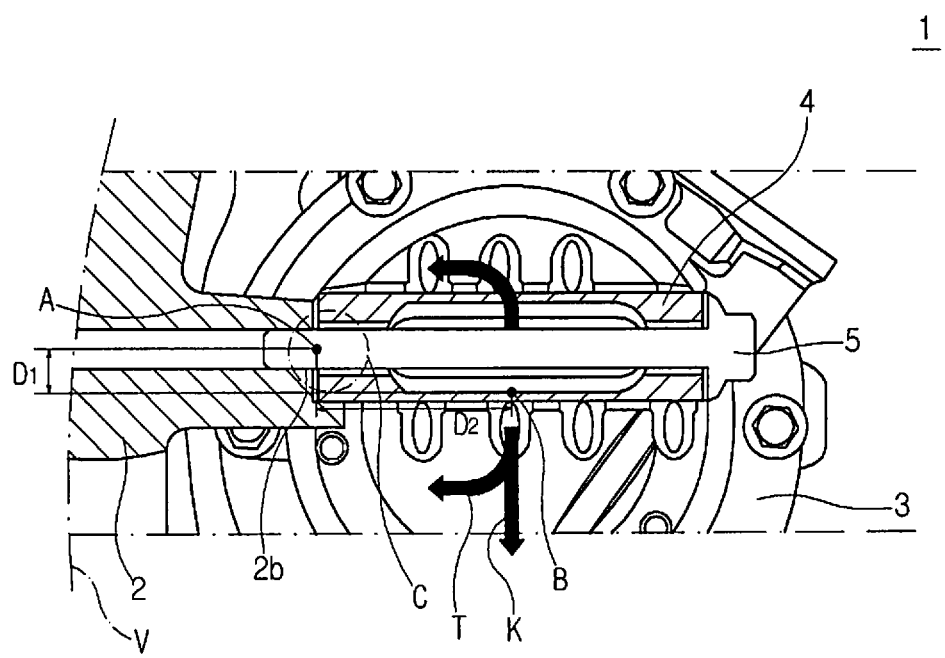
FIG. 2 is a view illustrating a distribution of rotational moment and fatigue stress applied to the compressor and its fastening bolt according to which a compressor's point of support are a compressor's center of gravity are oriented in different directions.

In the conventional compressor fastening structure illustrated in FIGS. 1 and 2, a rotational moment occurs due to the difference between the distances D1 and D2 since the compressor is horizontally mounted to the vehicle. However, it is possible to relieve an increase in fatigue stress S occurring in each of the fasteners 140 due to vibration and/or impact caused while the vehicle is traveling since no rotational moment occurs with the absence of the horizontal distance in the compressor 100 of the present disclosure.

In the present disclosure, the fatigue stress S applied to each of the fasteners 140 by the self-weight of the compressor 100 occur in the longitudinal direction of the fastener 140 or in the direction perpendicular to the ground. This fatigue stress is concentrated on the portion C of the fastening bolt (see FIG. 2) in the conventional fastening structure, whereas the fatigue stress S occurring due to gravity K is evenly dispersed and distributed in the longitudinal direction of the fastener 140 in the present disclosure. Therefore, rigidity against the fatigue failure of the fastener 130 is relatively increased compared to the conventional fastening structure.

In detail, referring to FIG. 9, the fastener 140 has a head 142 seated into the support bracket 120, and the second thread 141 is formed on the outer peripheral surface of the fastener 140 to engage with the first thread 131 of the fastening part 130.

Thus, the fatigue stress is dispersed by the head 142 and the engagement of the first and second threads 131 and 141 to be distributed in the longitudinal direction of the fastener 140.

Through such a structure, the fatigue stress S is not concentrated on the specific portion of the bolt fastened in the direction horizontal to the ground as in the related art illustrated in FIGS. 1 and 2, but it is dispersed and distributed in the longitudinal direction of the fastener 140. Therefore, the service life of the fastener 140 is extended.

The dispersion and distribution of the fatigue stress S in the fastener 140 can exhibit an effect of absorbing shocks since, even though vibration or impact occurs while the vehicle is traveling, this vibration or impact is perfectly absorbed by the fastener 140 when it is transmitted from the support bracket 120 through the fastening part 130 to the compressor 100.

In the present disclosure as described above, the compressor 100 is mounted to the compressor mounting part V of the vehicle in the longitudinal direction of the fastener 140 or in the direction perpendicular to the ground so that the compressor's point of support A and the compressor's center of gravity are positioned on the same line in the same direction. Therefore, the occurrence of rotational moment due to the distance therebetween is prevented and the fatigue stress S occurring in the fastener 140 is dispersed and distributed in the longitudinal direction of the fastener 140. Consequently, it is possible to relieve the damage of the fastener 140 and extend the service life thereof, and ultimately to more securely fasten the compressor.

Figure 10:
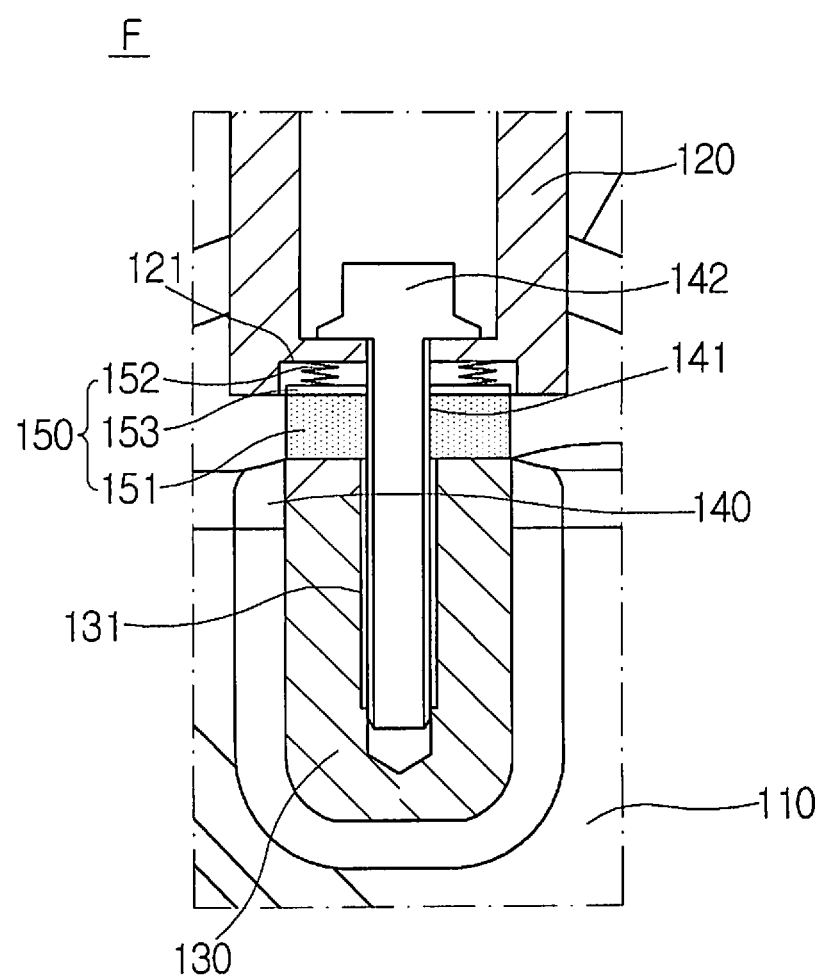
FIG. 10 is a view illustrating a second example of a buffer in the present disclosure.
Figure 11:
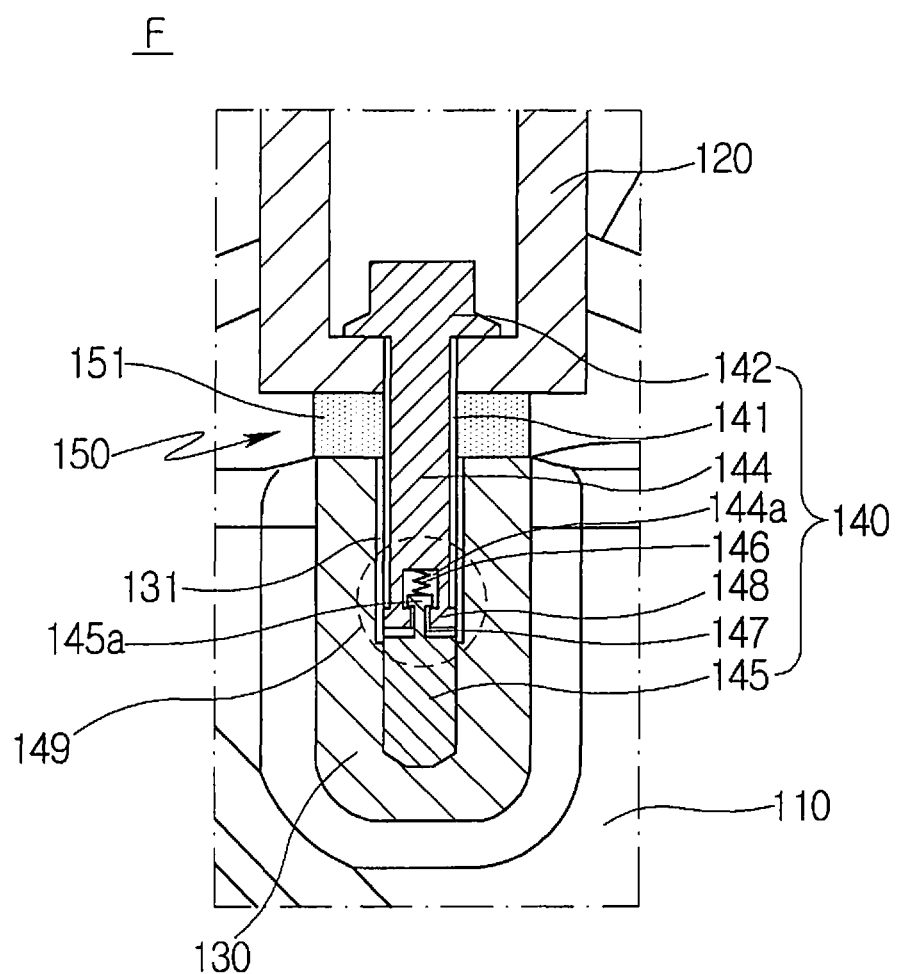
FIG. 11 is a view illustrating a structure of a stem buffer in the present disclosure.

To relieve the vibration and/or impact transmitted from the support bracket 120 through the fastening part 130 to the compressor 100, the present disclosure further includes a buffer structure illustrated in FIGS. 9 to 11. The buffer structure of the present disclosure will be described below.

FIG. 9 is a view illustrating a first example of a buffer 150 in the present disclosure.

Referring to FIG. 9, in the first example of the buffer 150, the buffer 150 may include a contact pad 151 disposed between the support bracket 120 and the fastening part 130 to relieve the vibration and/or impact transmitted from the compressor mounting part V of the vehicle to the compressor 100. The contact pad 151 may be made of a material having heat resistance and elasticity. For example, the material of the contact pad 151 may be plastic, rubber, silicon, or resin fiber which is resistant to heat.

In the first example of the buffer 150, through the above structure, the buffer 150 can relieve the fastening damage of the compressor 100 by absorbing the vibration and/or impact transmitted from the compressor mounting part V to the compressor 100 while the vehicle is traveling in the operating environment such as speed bumps or unpaved roads.

FIG. 10 is a view illustrating a second example of a buffer 150 in the present disclosure.

Referring to FIG. 10, in the second example of the buffer 150, the buffer 150 may include a contact pad 151, a shock-absorbing elastic body 152, and a buffering block 153.

The contact pad 151 may be a contact pad disposed between the support bracket 120 and the fastening part 130. The contact pad 151 may be made of a material having heat resistance and elasticity. For example, the material of the contact pad 151 may be plastic, rubber, silicon, or resin fiber which is resistant to heat.

The shock-absorbing elastic body 152 may be disposed in a bracket groove 121 formed in the lower end of the support bracket 120, and may be made of an elastic material. For example, the shock-absorbing elastic body 152 may be a coil spring or a leaf spring.

The buffering block 153 may be provided such that the upper side thereof is connected to the lower end of the shock-absorbing elastic body 152 and the lower side thereof is connected to the upper surface of the contact pad 151 for the smooth vertical movement of the contact pad 151 made of an elastic material according to the operation of the shock-absorbing elastic body 152. The buffering block 153 may be made of a material such as heat-resistant metal or plastic.

In the second example of the buffer 150, through the above structure, the buffer 150 can relieve the damage of the fastening structure of the compressor 100 in such a manner that the contact pad 151 primarily absorbs the vibration and/or impact transmitted from the compressor mounting part V to the compressor 100 while the vehicle is traveling in the operating environment such as irregular roads and the shock-absorbing elastic body 152 secondarily absorbs the vibration and/or impact. This structure is effective to absorb vertical vibration or impact that mainly occurs while the vehicle is traveling.

FIG. 11 is a view illustrating a structure of a stem buffer 149 in the present disclosure.

Referring to FIG. 11, the fastener 140 may include a head 142, a first stem 144, a second stem 145, and a stem buffer 149.

The head 142 may be seated into the support bracket 120 and form an upper portion of the fastener 140.

The first stem 144 may be disposed beneath the head 142 and the second thread 141 may be formed along the outer peripheral surface of the first stem 144. The second stem 145 may be disposed beneath the first stem 144.

The stem buffer 149 may be disposed between the first stem 144 and the second stem 145 to relieve the vibration and/or impact transmitted from the compressor mounting part V through the fastener 140 to the compressor 100.

The stem buffer 149 may include a stem groove 144a, a guide block 148, a connecting protrusion 145a, and a stem elastic body 146.

The stem groove 144a may be formed in the lower end of the first stem 144, and the guide block 148 may be formed along the circumference of the stem groove 144a in the lower end of the first stem 144. The guide block 148 may have a shape that protrudes inward from the stem groove 144a.

The connecting protrusion 145a may be formed at the upper end of the second stem 145. The connecting protrusion 145a may be supported by the guide block 148 for separation prevention and be inserted and disposed into the stem groove 144a.

The stem elastic body 146 may be disposed between the inside of the stem groove 144a and the connecting protrusion 145a.

Here, the lower end of the first stem 144 may be spaced apart from the upper end of the second stem 145 by a certain distance, and the gap therebetween may be a space for absorbing the impact vertically transmitted during the operation of the vehicle. The stem elastic body 146 provides a restoring force to move the second stem 145 to its original position by pushing the second stem 145 downward again after buffering.

The connecting protrusion 145 has a guide groove 147 disposed at the lower end thereof. In this case, since the guide block 148 protrudes toward the connecting protrusion 145a, the guide groove 147 moves along the guide block 148, thereby guiding the vertical movement of the second stem 145.

The disclosure described above is only to exemplify the specific embodiment of the compressor.

Therefore, it will be apparent to those skilled in the art that various modifications or variations may be made without departing from the spirit and scope of the disclosure as defined in the following claims.

INDUSTRIAL APPLICABILITY

The present disclosure relates to a compressor that is industrially applicable.

The invention claimed is:

1. A compressor for a vehicle mounted to a support bracket disposed in a compressor mounting part of a vehicle, the compressor comprising:
   a casing;
   a fastening part disposed at a portion corresponding to the support bracket on the casing; and
   a fastener connecting the support bracket to the fastening part,
   wherein a compressor's center of gravity and a compressor's point of support supported by the fastener are positioned in a longitudinal direction of the fastener;
   wherein the compressor's center of gravity and the compressor's point of support are positioned in a direction perpendicular to the direction of gravity, and
   wherein the compressor's center of gravity is positioned lower than the compressor's point of support in the direction of gravity,
   wherein the support bracket consists of a plurality of support brackets arranged in the compressor mounting part, the fastening part consists of a number of fastening parts corresponding to the number of support brackets on the casing, and the fastener consists of a plurality of fasteners connecting the support brackets to the fastening parts; and
   the compressor's point of support consists of a plurality of compressor's points of support by the plurality of fasteners, and
   wherein the compressor's point of support consists of three or more compressor's points of support, and the three or more compressor's points of support define a support region on the same plane, and
   wherein the casing includes a first housing that accommodates a motor, a second housing that accommodated an inverter for controlling the motor, and a third housing that accommodated a compression mechanism, and
   wherein two of each of the fastening part and fastener are disposed on the first housing and one of each of the fastening part and fastener are disposed in the third housing.

2. The compressor for a vehicle according to claim 1, wherein the compressor's center of gravity is positioned within the support region.

3. The compressor for a vehicle according to claim 2, wherein the compressor's center of gravity and a center of the compressor's points of support formed within the support region are positioned on the same line in the longitudinal direction of the fasteners.

4. The compressor for a vehicle according to claim 1, further comprising a buffer disposed between the support bracket and the fastening part to relieve vibration and/or impact transmitted from the compressor mounting part to the compressor.

5. The compressor for a vehicle according to claim 4, wherein the buffer is disposed between the support bracket and the fastening part and comprises a contact pad made of an elastic material.

6. The compressor for a vehicle according to claim 5, wherein the buffer further comprises:

a shock-absorbing elastic body disposed in a bracket groove formed in a lower end of the support bracket; and a buffering block, an upper side of which is connected to a lower end of the shock-absorbing elastic body, while a lower side of the buffering block is connected to an upper surface of the contact pad.

7. A compressor for a vehicle mounted to a support bracket disposed in a compressor mounting part of a vehicle, the compressor comprising:

a casing;

a fastening part disposed at a portion corresponding to the support bracket on the casing; and a fastener connecting the support bracket to the fastening part, wherein a compressor's center of gravity and a compressor's point of support supported by the fastener are positioned in a longitudinal direction of the fastener, wherein the fastening part has a first thread formed therein, and the fastener has a second thread formed on its outer peripheral surface to be engaged to the first thread, wherein the fastener comprises:

a head seated into the support bracket;

a first stem disposed beneath the head, the second thread being formed along an outer peripheral surface of the first stem;

a second stem disposed beneath the first stem; and, a stem buffer disposed between the first stem and the second stem to relieve vibration and/or impact transmitted from the compressor mounting part through the fastener to the compressor, wherein the stem buffer comprises:

a stem groove formed in a lower end of the first stem; and a connecting protrusion formed at an upper end of the second stem and inserted and disposed into the stem groove.

8. The compressor for a vehicle according to claim 7, wherein the stem buffer further comprises a guide block formed along a circumference of the stem groove in the lower end of the first stem and having a shape that protrudes inward from the stem groove, and the connecting protrusion is supported by the guide block for separation prevention.

9. The compressor for vehicle according to claim 8, wherein the stem buffer further comprises a stem elastic body disposed between the inside of the stem groove and the connecting protrusion.

* * * * *